US008363069B2

(12) United States Patent
Aldrich et al.

(10) Patent No.: US 8,363,069 B2
(45) Date of Patent: Jan. 29, 2013

(54) CALIBRATION METHOD AND APPARATUS FOR LIGHTING FIXTURES USING MULTIPLE SPECTRUM LIGHT SOURCES AND LIGHT MIXING

(75) Inventors: Matthew H. Aldrich, Arlington, VA (US); Michael E. Garbus, Jr., Reston, VA (US)

(73) Assignee: ABL IP Holding LLC, Conyers, GA (US)

( * ) Notice: Subject to any disclaimer, the term of this patent is extended or adjusted under 35 U.S.C. 154(b) by 1671 days.

(21) Appl. No.: 11/585,779

(22) Filed: Oct. 25, 2006

(65) Prior Publication Data

US 2008/0103714 A1 May 1, 2008

(51) Int. Cl.
*G09G 5/10* (2006.01)
(52) U.S. Cl. ............................. 345/690; 345/83; 356/236
(58) Field of Classification Search .......... 345/204–215, 345/690–698, 83; 356/2–4.07, 6, 9, 43–47, 356/53, 303, 338, 451–456, 500, 154, 390, 356/405, 406, 411, 222–229
See application file for complete search history.

(56) References Cited

U.S. PATENT DOCUMENTS

| | | | |
|---|---|---|---|
| 6,007,209 A | 12/1999 | Pelka | |
| 6,222,172 B1 | 4/2001 | Fossum et al. | |
| 6,357,889 B1 | 3/2002 | Duggal et al. | |
| 6,969,843 B1 | 11/2005 | Beach et al. | |
| 7,108,413 B2 | 9/2006 | Kwong et al. | |
| 7,145,125 B2 | 12/2006 | May et al. | |
| 7,148,632 B2 | 12/2006 | Berman et al. | |
| 2003/0076056 A1 | 4/2003 | Schuurmans | |
| 2004/0160199 A1 | 8/2004 | Morgan et al. | |
| 2006/0092183 A1* | 5/2006 | Malmberg | 345/690 |
| 2006/0114451 A1* | 6/2006 | Wang et al. | 356/218 |
| 2006/0164408 A1* | 7/2006 | Nishikawa et al. | 345/207 |
| 2006/0221341 A1* | 10/2006 | Paul et al. | 356/406 |
| 2006/0232576 A1* | 10/2006 | Evanicky et al. | 345/207 |

OTHER PUBLICATIONS

U.S. Office Action Issued in U.S. Appl. No. 11/233,036, dated on May 30, 2007.

* cited by examiner

*Primary Examiner* — Amare Mengistu
*Assistant Examiner* — Vinh Lam
(74) *Attorney, Agent, or Firm* — McDermott Will & Emery LLP (57) ABSTRACT

Disclosed examples of optical systems having a plurality of light sources with each source having a different spectral outputs may be calibrated by measuring a spectral characteristic of the combined light with two measurements, e.g., one from a colorimeter and one from a sensor included in the system. Accordingly, one can determine a transform function in response to the two measures that models a feedback response of the optical system for each of a plurality of the inputs that would cause the optical system to generate radiant energy within a predetermined range of a spectrum. In order to calibrate the optical system, the transform function is programmed in the optical system to enable the optical system to transform an input to the optical system to a plurality of unique control signals each for controlling a respective light source of the plurality of light sources.

19 Claims, 7 Drawing Sheets

PRIOR ART

FIG. 10

CALIBRATION METHOD AND APPARATUS FOR LIGHTING FIXTURES USING MULTIPLE SPECTRUM LIGHT SOURCES AND LIGHT MIXING

TECHNICAL FIELD

The present subject matter relates calibration of lighting fixtures having multiple light sources each of which are capable of outputting light of different colors.

BACKGROUND

An increasing variety of lighting applications require a precisely controlled spectral characteristic of the radiant energy. It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized light emitting diodes or other solid state light sources as the sources of the different light colors.

Light emitting diodes (LEDs) for example were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Additionally, for many lighting applications, an LED based fixture incorporates a circuit board supporting and providing electrical connections to a number of individually packaged LEDs. Often the LEDs are arranged in a fairly tight matrix array (see e.g. U.S. Pat. No. 6,016,038), although a variety of other arrangements are known. For example, U.S. Pat. No. 6,995,355 to Rains, Jr. et al. discloses lighting systems using circular or linear arrangements of LED sets as well as rectangular matrix arrangements and other position patterns. In the noted examples, the sets of LEDs have included LEDs configured for emitting different individual colors or wavelengths (e.g. red, green and blue), although the U.S. Pat. No. 6,995,355 patent also suggests inclusion of white LEDs or other white light sources. The red, green and blue light allows adjustment and control of the character of the combined light emitted by the system. As the quality of white LEDs continues to improve, newer lights will utilize similar arrangements of LEDs where all the LEDs are white LEDs.

It is well known that many different combinations of wavelengths can produce the same perception of color, and that "Chromaticity" has been long been used to describe the perceived color of a visual stimulus of a human. Many models have been used describe Chromaticity. In one implementation, the CIE system characterizes a given visual stimulus by a luminance parameter Y and two chromaticity coordinates x and y that specify a particular point on the well-known chromaticity diagram. The CIE system parameters Y, x and y are based on the spectral power distribution of the energy emission from a light source. This model also takes into consideration various color sensitivity functions which correlate generally with the response of the human eye.

Figure 10:
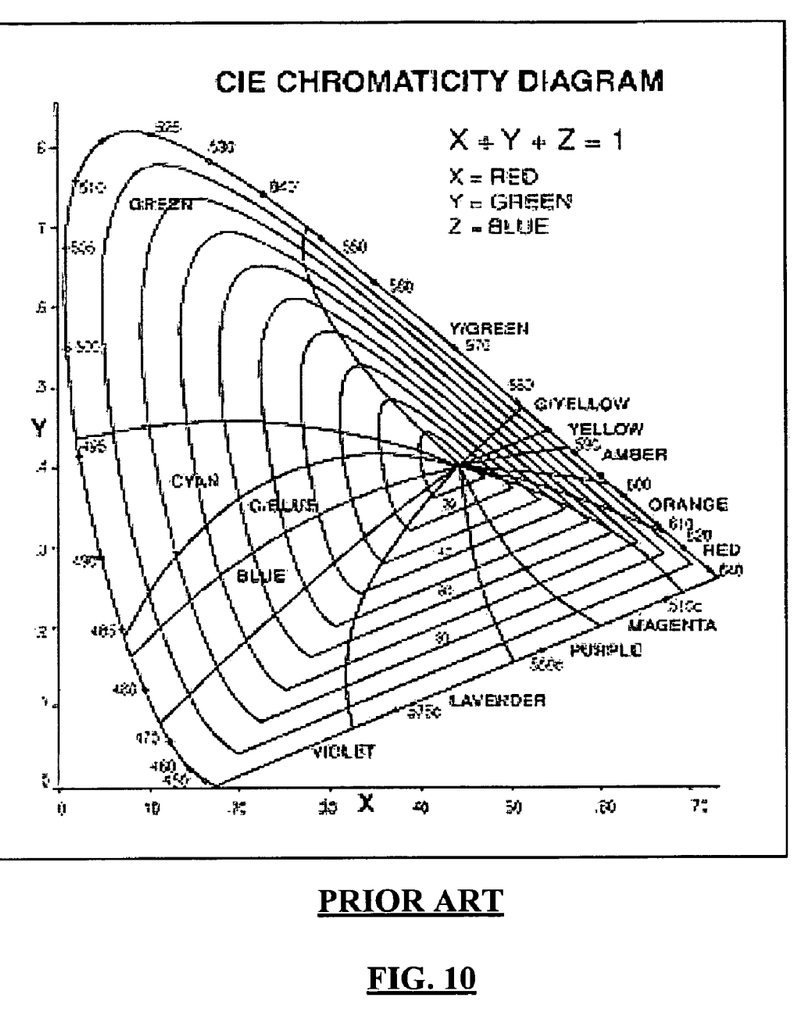
FIG. 10 illustrates a known CIE Chromaticity diagram.

Also, commonly used primary colors Red, Green and Blue of different amounts can be combined to produce almost any color in the visible spectrum in an optical system. These colors can be represented by the CIE tristimulus values, commonly referred to as X, Y, and Z, respectively, and as illustrated by FIG. 10. Thus, the CIE xyY coordinates may be converted to CIE XYZ coordinates for controlling aforementioned LEDs using the following equations:

$$X = \frac{x}{y}Y \quad \text{(Eqn. A)}$$

$$Y = Y \quad \text{(Eqn. B)}$$

$$Z = \frac{1-x-y}{y}Y \quad \text{(Eqn. C)}$$

Conventionally, the aforementioned LED lighting fixtures have been controlled by user inputs using either the xyY or XYZ parameters coordinates above. However, controlling the aforementioned light fixtures in this manner can lead to certain performance inadequacies. For example, LEDs that are capable of emitting light at different wavelengths tend to have different and unique output characteristics. That is, the spectral output differs between similar LEDs based on a given input level that is applied to each LED. For a drive current or power of a given setting, nominally identical LEDs often will produce somewhat different output intensity and may produce light of slightly different colors. Several contributory factors include production variations among the LEDs, as well as differences among the analog drivers that control the flow of current to each LED. As a result, nominally identical light fixtures using LEDs and current of the same types often produce different outputs.

In order to overcome the aforementioned problems, a designer has to manually calibrate each fixture. Specifically, the designer would use a colorimeter to measure an output of each LED (or string of LEDs of a particular color) and manually tune settings for each analog driver circuit until it was decided that the spectral output closely matched the desired color according to the input setting. Then the analog driver settings would be saved as a preset. This process would be repeated for each color of LED used in the light fixture, until all of the LEDs in a given fixture had been manually tuned and presets had been established to support a number of overall color output settings.

It is evident that conventional calibration techniques take time and cost money especially when manufacturing LED fixtures on a large scale. Also, operations of systems calibrated in such a manner are limited by the practical number of presets available. Hence, a need exists for a way to calibrate LED fixtures in an efficient manner that can be implemented on a large production scale. Preferably, such a technique should offer an increased degree of responsiveness to user inputs, without the need for storing large numbers of preset values.

SUMMARY

The teachings herein alleviate one or more of the above noted problems by a method for calibrating an optical system having a plurality of light sources where the system outputs combined light from the sources, and the plurality of light sources have different spectral outputs relative to an input setting which represents a desired characteristic of the combined light.

In order to calibrate the optical system, a first set of data corresponding to measurements of a spectral characteristics of the combined output of the plurality of light sources is generated using a calibrated meter, and a second set of data corresponding to characteristics of the combined output of the plurality of light sources is determined using a sensor that is different from the calibrated meter. As a result, a transform function may be determined that is in response to the first set of data and the second set of data. The transform function models a feedback response of the optical system for each of a plurality of different input settings that would cause the optical system to generate radiant energy within a predetermined range of a spectrum. Accordingly, the transform function can be programmed in the optical system to enable the optical system to transform an input to the optical system to a plurality of unique control signals each for controlling a respective light source of the plurality of light sources.

Moreover, the optical system which includes a color sensor for measuring characteristics of the combined light may be operated in the following manner. The optical system receives a user input which maps color to a predefined coordinate space in at least two colors, and the user input is transformed to a set of expected color component values representing expected measurements of the color sensor had the plurality of light sources output light corresponding to the user input in actual operation. Accordingly, control signals for operating the plurality of light sources based on the set of expected color components are output, and the plurality of light sources are driven based on the control signals. Following these steps, the control signals may be adjusted based on measurements of the spectral outputs received from the color sensor.

Another implementation of the novel concepts discussed herein is a system for emitting light. The system includes a plurality of light sources for emission of light and for thereby producing visible light to form a combined light at least of portion of which is output from the system. The system also includes a color sensor and a microcontroller. The color sensor measures color components emitted by the plurality of light sources contained within the combined light, and the microcontroller processes newly user inputted color parameters and controls illumination of the plurality of light sources. Moreover, the microcontroller is configured to execute the following for initially driving the plurality of light sources for the newly inputted color parameters. Newly inputted color parameters are transformed to a set of expected color component values representing expected measurements of the color sensor had the plurality of light sources output light corresponding to the newly inputted color parameters in actual operation, and the illumination of the plurality of light sources is controlled based on the expected set of color component values.

Yet another implementation of the novel concepts discussed herein is a lighting system which includes first and second solid light emitting elements, a mixing element, a user interface, a sensor and a control circuit. The first solid state light emitting element emits electromagnetic energy of a first spectral characteristic, and the second solid state light emitting element emits electromagnetic energy of a second spectral characteristic different from the first spectral characteristic. The mixing element is coupled to receive electromagnetic energy of the first and second spectral characteristics emitted by the first and second solid state light emitting elements, for mixing the received energy to form a combined electromagnetic energy into a region to facilitate a humanly perceptible lighting application for the system. The user interface is provided for user input of a desired setting for a spectral characteristic of the combined energy output. The sensor detects a spectral characteristic of the combined electromagnetic energy. The control circuit performs a matrix transform operation on data related to the user input of the desired setting to generate data related to expected spectral characteristic of the combined electromagnetic energy by the sensor and using the expected spectral characteristics of the combined electromagnetic energy to determine respective output settings for the first and second solid state light emitting elements. Moreover, the control circuit applies the respective output settings to control amounts of electromagnetic energy of the first and second spectral characteristics emitted by the first and second solid state light emitting elements to achieve a spectral characteristic of the combined energy substantially corresponding to the desired setting.

The detailed description below discloses details of the aforementioned calibration method as well as methods of operating an optical system that has been calibrated as described herein. Moreover, the detailed description describes such an optical apparatus that is capable of being calibrated in the described manner.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The examples presented below provide solutions to the aforementioned problems of calibration in the conventional lighting art. The inventors have found that a standard coordinate system can be mapped to each individual set of electronics controlling a plurality of light sources so as to output a uniform color according to an input corresponding to a desired color using the standard coordinate system. This may be accomplished by determining and implementing a transform function to transform the standard coordinate values to system specific values for controlling the output of the LEDs or other types of solid state lighting sources. This solution, for example, can be applied to an optical system having a plurality of light sources outputting combined light where the plurality of light sources have different spectral outputs relative to an input setting which represents a desired characteristic of the combined light. Furthermore, the solution is applicable to such a system where the LEDs or other sources are capable of outputting light in different colors.

The calibration technique and exemplary fixture geometry discussed herein may be used with any appropriate type of sources of radiant electromagnetic energy. Exemplary sources of radiant electromagnetic energy include various conventional forms of incandescent, arc, neon and fluorescent lamp. Typically, at least some of the sources take the form of solid state light emitting elements. As discussed herein, solid state light emitting elements essentially includes any of a wide range light emitting or generating device formed from organic or inorganic semiconductor materials. Examples of solid state light emitting elements include semiconductor laser devices. Many common examples of solid state lighting elements are classified as a different types of "light emitting diodes" or "LEDs." This class of devices encompasses any and all types of semiconductor diode devices that are capable of receiving an electrical signal and producing a responsive output of electromagnetic energy. Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs that contain separately controllable R, G and B LEDs within one package. Those skilled in the art will recognize that "LED" terminology does not restrict the source to any particular type of package for the LED type source. Such terms encompass LED devices that may be packaged or non-packaged, chip on board LEDs, surface mount LEDs, and any other configuration of the semiconductor diode device that emits light. Solid state lighting elements may include one or more phosphors and/or nanophosphors based upon quantum dots, which are integrated into elements of the package or light processing elements to convert at least some radiant energy to a different more desirable wavelength.

The color of light or other electromagnetic radiant energy relates to the frequency and wavelength of the radiant energy and/or to combinations of frequencies/wavelengths contained within the energy. Many of the examples relate to colors of light within the visible portion of the spectrum, although the teachings may also apply to systems that utilize or emit other energy.

It also should be appreciated that solid state light emitting elements may be configured to generate electromagnetic radiant energy having various bandwidths for a given spectrum (e.g. narrow bandwidth of a particular color, or broad bandwidth centered about a particular), and may use different configurations to achieve a given spectral characteristic. For example, one implementation of a white LED may utilize a number of dies that generate different primary colors which combine to form essentially white light. In another implementation, a white LED may utilize a semiconductor that generates light of a relatively narrow first spectrum that acts as a pump. The light from the diode "pumps" a phosphor material or quantum dots contained in the LED package, which in turn radiates a different typically broader spectrum of light that appears relatively white to the human observer.

Figure 1:
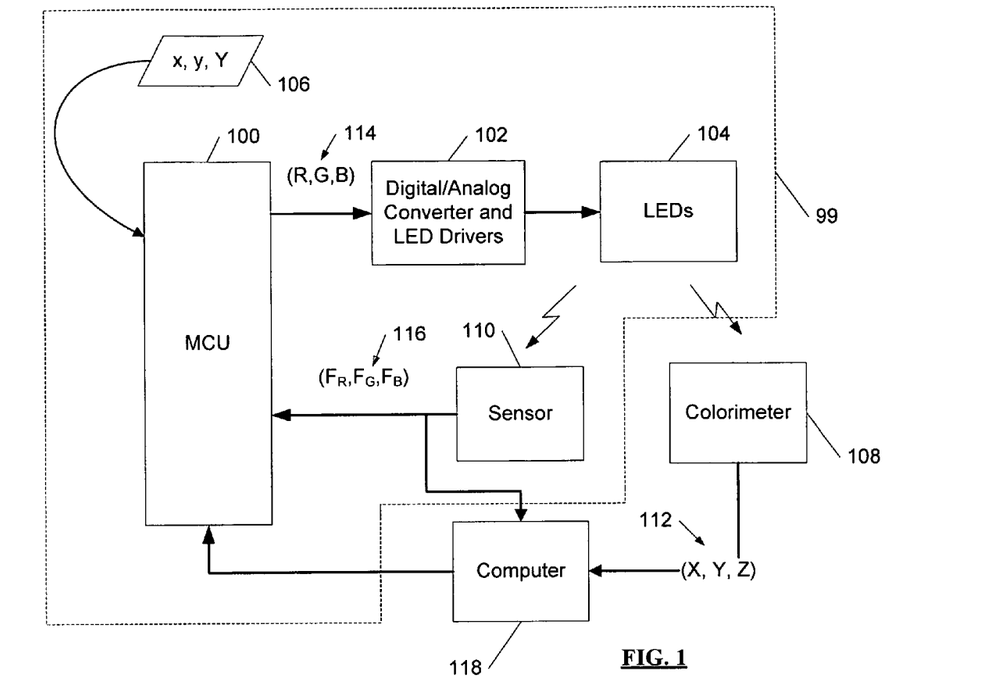
FIG. 1 illustrates an example of an optical system and components for calibrating the optical system.

FIG. 1 illustrates a high-level block diagram of an optical system 99 and sensors used to control and calibrate the optical system 99. Specifically, the optical system 99 includes a microcontroller unit 100 which controls the digital-to-analog converters and LED drivers 102 for controlling the LED light sources 104. The system 99 which outputs combined light (examples of the manner in which the set of LED light sources 104 output combined light is discussed below with FIG. 2). In a system 99 intended to produce a wide variety of combined light output colors, the set of LEDs 104 will include one or more LEDs of each of two, three or more light colors. At least for each different color of the LEDs, there will be an associated digital-to-analog converter and LED driver to control the output amount of that color of light. While FIG. 1 illustrates LED light sources 104, typically red (R), green (G) and blue (B) LEDs, it should be appreciated that other solid state light emitting elements could be used as described above. The optical system 99 also includes a sensor 110 discussed below.

It is useful to calibrate the optical system 99 of FIG. 1 because when the input 106 is applied to the LED light sources 104 in RGB coordinates 114, the spectral output of each LED light source 104 tends to be slightly different from fixture to fixture as compared to the desired output represented by the input 106. Specifically, the color of light output by combination of light from the LED light sources 104 may be different from the desired color represented by the input 106. Also, it should be appreciated that while FIG. 1 illustrates an input 106 in chromaticity coordinates xyY, the input may be tristimulus values XYZ or even RGB values. An input 106 of RGB values may be applied to the MCU 100 or directly to the digital and analog converter and LED drivers 102. However, for explanation purposes, this description refers to the color and/or intensity input setting values 106 in chromaticity coordinates xyY applied to the MCU 100. In operation, the color input setting 106 may come from a user interface device or a central control system; although during calibration, the input settings 106 may be automatically input, e.g. by computer 118.

Conventionally, a limited number of readings taken by a calorimeter were used to manually tune settings for each digital-to-analog converters and LED drivers until a designer decided that the combined light output of each LED light source closely matched the desired color according to the input. These settings were saved as a preset for a select few inputs because it was not practical to calibrate the optical system for all possible inputs in a given range, such as that corresponding to the visible spectrum. In order to do so, a designer would have had to manually determine settings for each of the digital-to-analog converters and LED drivers for all inputs in a given range. As a result, calibration could possibly take many hours for a range that comprises over 1000 different inputs.

FIG. 1 illustrates the components for automatically calibrating the optical system 99 that overcomes the cumbersome, manual iterative process that has plagued designers when calibrating light fixtures which output combined light as described above. In FIG. 1, automatic calibration may be achieved by interfacing a calibrated colorimeter 108 and computer 118 with the optical system 99. The calorimeter 108 is configured to sense and measure chromaticity of the spectral output of the LED light sources 104, and output measurements of data for tristimulus values 112. However, it should be appreciated that measurements may be taken in other chromaticity coordinates, such as xyY or other coordinates that take into account various color sensitivity functions which correlate generally with the response to the human eye. The computer 118 receives measurements from the calorimeter 108 as well as measurements from the sensor 110. Accordingly, with this set up, limitations to the conventional calibration techniques can be overcome by calibrating the optical system 99 for any input 106 within a predetermined range without having to measure each and every input 106 within the predetermined range during calibration.

Using the measurements 112, 116 output by the calorimeter 108 and sensor 110, respectively, the computer 118 models the response of the optical system 99 based on any input 106 that is within a predetermined range. Specifically, the optical system 99 can be modeled using the computer 118 to determine a transform function between all values of the input 106 within a predetermined range and the settings for each digital-to-analog converters and LED drivers 102 such that the combined spectral output of the LED light sources 104 is substantially the same as the desired output represented by the input 106. As a result, a transform function that models the optical system 99 for all inputs 106 within a predetermined range avoids the need to manually determine settings for each digital-to-analog converters and LED drivers 102 for all inputs, as is the case for conventional calibration techniques.

The predetermined range referred to above corresponds to the range of values measured by the colorimeter 108, which in this example corresponds to the visible spectrum. However, it should be appreciated that a meter that measures either a broader spectrum or a different spectrum (e.g., UV spectrum) may be used instead of the colorimeter 108. In this case, the optical system 99 may be calibrated for the spectrum measured by such a meter.

As will be described further below, the computer 118 determines a transform function that can be applied to all inputs 106 within a predetermined range. The characteristics of the optical system 99 discovered by the inventors have made it possible for the computer 118 to model the optical system 99 based at least three inputs 106 corresponding to the three primary colors of Red, Green and Blue. It should be appreciated that other colors can be used to model the system. As a result, for example, a model for the visible spectrum generated by the computer 118 substantially reduces calibration time as only a few colors need to be generated during calibration.

As mentioned above, the transform function may be determined from measurements taken from the colorimeter 108 and sensor 110. It should be further appreciated that the colorimeter 108 is used to measure the visible spectral characteristics of the combined light output of the system, which includes light from each LED light source 104. The colorimeter 108 outputs spectral measurements according to the tristimulus units of measure (a measurement that takes into consideration various color sensitivity functions which correlate generally with the response of the human eye). In the example, the sensor 110 measures the intensity of three primary colors of light each corresponding light output from one of the LED light sources 104. In a specific example, a pulse frequency of the output of the sensor is proportional to the measured intensity, and the sensor can be controlled to take measurements of at least three primary colors, typically red, green and blue. Generally stated, the colorimeter 108 outputs measures of light and generates a first set of data corresponding to measurements of tristimulus values, and the sensor 110 outputs a second set of data corresponding to measurements of light represented by sensor pulse output frequency. Based on these measurements, a transform function may be determined that represents the relationship between measured tristimulus values 112 for a given input and the frequency values of the sensor measurements 116 for each of input settings representing the primary colors. Also, the transform function may be further defined to represent the relationship between the aforementioned values and the RGB values 114 needed to be output to each digital-to-analog converters and LED drivers 102 such that the combined light spectral output of each of the LED light sources 104 is substantially the same that desired as represented by the input 106. In other words, to achieve the visual affect were the combined light output by a set of LED light sources 104 is the same as that represented by the input, the transform function models the optical system 99 such that for an input 106 applied to the system 99, the RGB values generated by the MCU 100 will be calibrated for the respective set of the LED light sources 104. In such a case, the calibrated RGB values 100 will be specific to each LED light source 104 such that the combined light output of each fixture will be visually the same.

The manner in which to determine and implement the transform function is described in greater detail below in connection with FIGS. 8 and 9. However, it is useful to understand the optics and system to which the transform function will be applied. The description in connection with FIGS. 2-7 provide such information.

Figure 2:
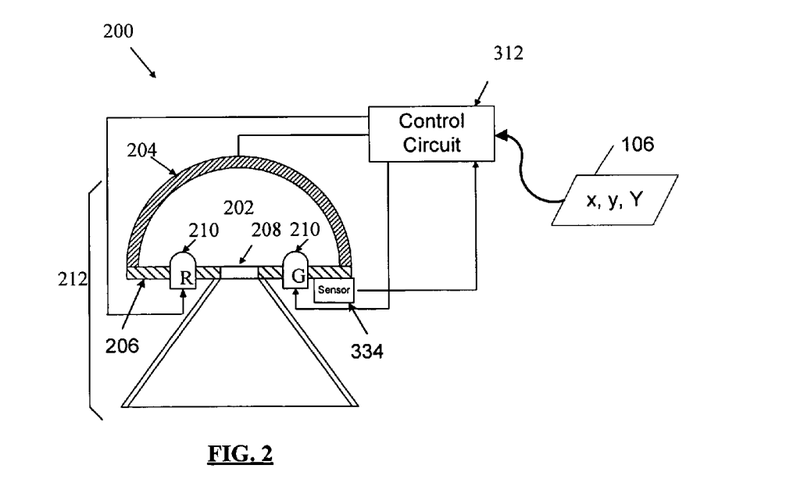
FIG. 2 illustrates an LED light fixture and associated components.

FIG. 2 is a partial block diagram and a cross-sectional illustration of the light fixture for a light distribution apparatus or system 200. For illumination or task lighting applications, the fixture emits light in the visible spectrum.

The illustrated system 200 includes an optical cavity 202 having a diffusely reflective interior surface, to receive and combine light energy of different colors/wavelengths. The disclosed apparatus may use a variety of different structures or arrangements for the optical integrating cavity. The illustrated cross-section of the optical cavity 202 is approximately hemispherical. However, the optical cavity 202 may have various shapes such as semi-cylindrical with the cross-section taken perpendicular to the longitudinal axis. Other applications may call for rectangular or square cross-sections.

At least a substantial portion of the interior surface(s) of the optical cavity 202 exhibit(s) diffuse reflectivity. It is desirable that the cavity surface have a highly efficient reflective characteristic, e.g. a reflectivity equal to or greater than 90%, with respect to the relevant light wavelengths. For example, the interior surface of that illustrated by FIG. 2 is highly diffusely reflective to energy in the visible, near-infrared, and ultraviolet wavelengths.

As illustrated by FIG. 2, a hemispherical dome 204 and a substantially flat cover plate 206 form the optical cavity 202. However, other arrangements may be available. In the example the interior facing surfaces of the dome 204 and the cover plate 206 are highly diffusely reflective, so that the resulting cavity 202 is highly diffusely reflective with respect to the radiant energy spectrum produced by the system 200. In other arrangements, a portion or all of the inner surface of the dome 204 have a highly efficient reflective characteristic, e.g. a reflectivity equal to or greater than 90%, with respect to the relevant wavelengths, and the facing surface of the cover plate 206 is at least substantially specular in nature. In such arrangements, the volume or chamber 202 is an integrating type optical cavity. Although shown as separate elements, the dome 204 and plate 206 may be formed as an integral unit.

The optical integrating cavity 202 has an optical aperture 208 as a transmissive path for allowing emission of combined radiant energy. In the example, the aperture 208 is a passage through the approximate center of the cover plate 206, although the aperture may be at any other convenient location on the plate or the dome. Because of the diffuse reflections within the cavity 202, light within the cavity is integrated, mixed or combined before passage thereof out of the aperture 208. In other words, the system 200 is capable of emitting combined light downward through the aperture 208. However, the light fixture part of the system 200 may be oriented in any desired direction to perform a desired application function, for example to provide visible illumination of persons or objects in a particular direction or location with respect to the fixture or to illuminate an area or room. Although only a single aperture is shown, the fixture may include multiple apertures. Also, in some applications, it may be desirable for some of the light combined within the cavity 202 to pass through a transmissive portion of the cavity wall.

The system 200 also includes light emitting diodes (LEDs) 210 as the sources of light energy. In the example, the sources are different primary color (RGB) LEDs 210, two of which (Red and Green) are visible in the illustrated cross-section. The Blue LED (not shown) would be seen in a different cross section. The LEDs 210 supply light energy into the interior of the optical integrating cavity 202. As shown, the points of emission into the interior of the optical integrating cavity are not directly visible through the aperture 208. The cavity 202 effectively integrates, mixes or combines the light energy of different colors, so that the integrated or combined light emitted through the aperture 208 includes the light energy of all the various wavelengths in relative amounts substantially corresponding to the relative amounts that the sources input into the cavity 202.

The dome 204 and cover plate 206 forming the cavity 202, together with the LEDs 210 and possibly one or more processing elements for processing the light output through the aperture 208 (such as a deflector (not shown)), form a light fixture 212. The integrating or mixing capability of the cavity 202 serves to project light of any color, including white light, by adjusting the amount of light output by the various sources coupled into the cavity. U.S. Pat. No. 6,995,355 to Rains, Jr. et al., the disclosure of which is entirely incorporated herein by reference, provides additional information as to the materials; structure and configuration of numerous examples of systems and various elements thereof of the type exemplified by FIG. 2.

In the illustrated example, control of the drive currents applied to drive light production by the LEDs 210 controls the color characteristics of the combined light output by the fixture 212. Those skilled in the art will recognize that the circuitry may also modulate the drive signals to control amounts of energy output by each solid state lighting element. The control circuit 312 and sensor 334 are discussed in detail below with respect FIG. 3.

Figure 3:
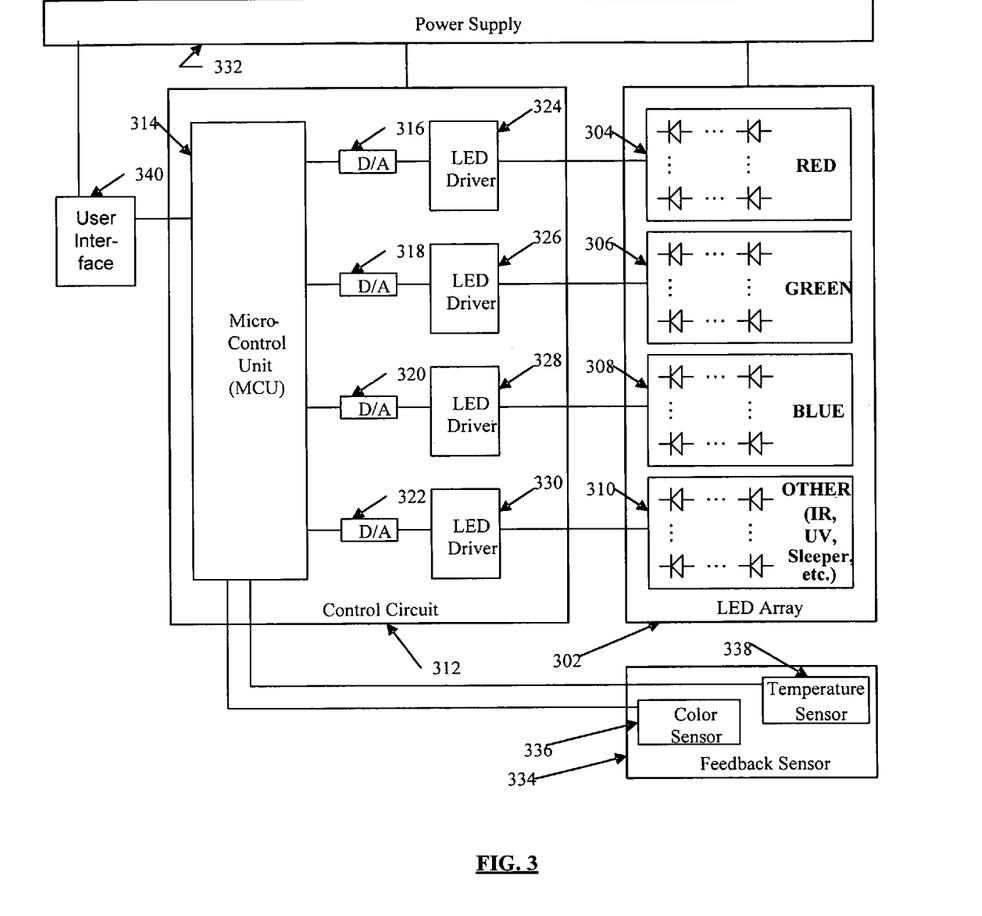
FIG. 3 illustrates a block diagram of the control circuitry for an optical system in accordance with the disclosed concepts.
Figure 4:
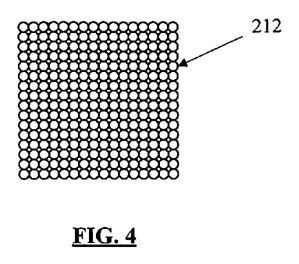
FIG. 4 illustrates an array of LEDs.
Figure 5:
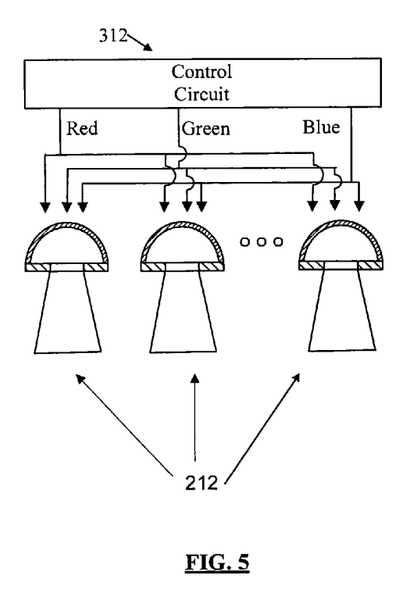
FIG. 5 illustrates a first exemplary configuration of control circuitry for controlling a plurality of light fixtures.
Figure 6:
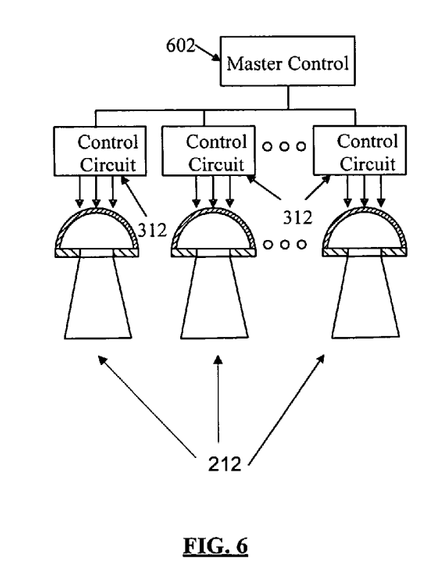
FIG. 6 illustrates a second exemplary configuration of control circuitry for controlling a plurality of light fixtures.

FIG. 3 illustrates a block diagram of the control circuitry for an optical system in accordance with the disclosed concepts. In the circuit of FIG. 3, the set of sources of light of the various types takes the form of a LED array 302 containing the plurality of LEDs 210 forming the fixture 212 such as that illustrated by FIG. 2. The control circuitry of FIG. 3 may control a plurality of fixtures 212 in various configurations such as that illustrated by FIG. 4. However, it should be appreciated that many other configurations of the plurality of fixtures 212 are indeed possible. Also, as illustrated by FIG. 5, the control circuitry 312 separately controls the plurality of Red LEDs, the plurality of Green LEDs, the plurality of Blue LEDs, etc. (discussed below) in the plurality of fixtures 212. Alternatively, as illustrated by FIG. 6, the system may include a plurality of control circuits 312 each for controlling a respective fixture 212 among a plurality of light fixtures 212. In this configuration, master control circuitry 602 may be used to control the plurality of the control circuits 312. However, it should be appreciated that the control circuitry discussed herein is applicable in many different arrangements where the control circuitry controls multiple sets of LEDs or dedicated control circuitry controls each one of a plurality of sets of LEDs.

Turning back to FIG. 3, the LED array 302 comprises two or more LEDs of each of the three primary colors red (R), green (G) and blue (B), each of which is represented by LED blocks 304, 306 and 308. As discussed above, these LED blocks may connect to one fixture 212 or span a plurality of such fixtures 212. Either configuration is possible. Moreover, the array 302 is not limited to RGB LEDs. White LEDs also may be included, or white LEDs of two or more different color characteristics may be substituted for the RGB LEDS.

The LED array 302 may also include a number of additional or 'other' LEDs 310. For example, the LED array 302 may include white, IR or UV LEDs for various purposes or additional LEDs as "sleepers" that initially would be inactive. For example, using the circuitry of FIG. 3 as an example, the Red LEDs 304, Green LEDs 306 and Blue LEDs 308 might normally be active. The LEDs 310 would be sleeper LEDs, typically including one or more LEDs of each color used in the particular system. Sleeper LEDs may be activated when needed, typically in response to feedback indicating a need for increased output (e.g. due to decreased performance of the originally active LEDs).

The electrical components shown in FIG. 3 also include a LED control system 312. The control system 312 includes LED driver circuits 324, 326, 328, 330 for the various LEDs as well as a microcontroller 314. The microcontroller 314 controls the LED driver circuits 324, 326, 328, 330 via digital-to-analog (D/A) converters 316, 318, 320, 322. More particularly, the driver circuit 324 drives the Red LEDs 304; the driver circuit 326 drives the green LEDs 306; and the driver circuit 328 drives the Blue LEDs 308. In a similar fashion, when active, the driver circuit 330 provides electrical current to the other LEDs 310. If the other LEDs provide another color of light, and are connected in series, there may be a single driver circuit 330. If the LEDs are sleepers, it may be desirable to provide a separate driver circuit 330 for each of the LEDs 310. The intensity of the emitted light of a given LED 304, 306, 308, 310 is proportional to the level of current supplied by the respective driver circuit 324, 326, 328, 330. The current output of each driver circuit is controlled by the higher level logic of the system.

The driver circuits 324, 326, 328, 330 supply electrical current at the respective levels for the individual sets of LEDs 304, 306, 308, 310 to cause the LEDs 304, 306, 308, 310 to emit light. For example, the microcontroller 314 controls the LED driver circuit 324 via a D/A converter 316, and the microcontroller 314 controls the LED driver circuit 326 via a D/A converter 318. Similarly, the microcontroller 314 controls the LED driver circuit 328 via a D/A converter 320. The amount of the emitted light of a given LED set 304, 306, 308 is related to the level of current supplied by the respective driver circuit 324, 326, 328.

In a similar fashion, the microcontroller 314 controls the LED driver circuit 330 via the D/A converter 322. When active, the driver circuit 330 provides electrical current to the other LEDs 310. If the LEDs are sleepers, it may be desirable to provide a separate driver circuit and D/A converter pair, for each of the LEDs 310 or for other sets of LEDs of the individual primary colors.

The LED driver circuits 324, 326, 328, 330, the D/A converters 316, 318, 320, 322 and the microcontroller 314 receive power from a power supply 332, which is connected to an appropriate power source (not separately shown). For most illumination applications, the power source will be an AC line current source, however, some applications may utilize DC power from a battery or the like. The power supply 332 provides AC to DC conversion if necessary, and converts the voltage and current from the source to the levels needed by the LED driver circuits 324, 326, 328, 330 the D/A converters 316, 318, 320, 322 and the microcontroller 314.

In operation, taking as example the operation of the Red LED 304, the D/A converters 316 receives a command for a particular level from the microcontroller 314. In response, the converter 316 generates a corresponding analog control signal, which causes the associated LED driver circuit 324 to generate a corresponding power level to drive the Red LED 304. The Red LED 304 in turn outputs light of a corresponding intensity. The D/A converter 324 will continue to output the particular analog level, to set the Red LED 304 intensity in accord with the last command from the microcontroller 314, until the microcontroller 314 issues a new command to the D/A converter 316. The other D/A converters 318, 320, 322, the LED driver circuits 326, 328, 330 and LEDs 306, 308 310 operate in a similar fashion.

Though not illustrated, the microcontroller 314 typically includes or has coupled thereto random-access memory (RAM) for storing data and read-only memory (ROM) and/or electrically erasable read only memory (EEROM) for storing control programming and any pre-defined operational parameters. The microcontroller 314 itself comprises registers and other components (not shown) for implementing a central processing unit (CPU) and possibly an associated arithmetic logic unit (not shown). The CPU implements the program to process data in the desired manner and thereby generate desired control outputs.

The microcontroller 314 is programmed to control the LED driver circuits 324, 326, 328, 330 to set the individual output intensities of the LEDs to desired levels, so that the combined light emitted from the aperture 208 of the cavity 202 has a desired spectral characteristic and a desired overall intensity. The microcontroller 314 may be programmed so that when it receives control inputs via a user interface 340 specifying the particular color, it translates color input values into appropriate control values, as discussed further below. For discussion purposes, the user interface 340 is shown as an element of the system closely associated with the microcontroller 314 and other electrical elements of the lighting system. However, those skilled in the art will recognize that the system may include a communication interface or other link to a remote device or to some other system that provides the user interface (see e.g. above-incorporated U.S. Pat. No. 6,995,355 to Rains, Jr. et al., for additional information).

To insure that the desired mixture is maintained, the microcontroller 314 receives information concerning the light output from a feedback sensor 334. The feedback sensor 334 may include a color sensor 336 which measure the frequency of the light output or other types of sensors such as a thermal temperature sensor 338, for example, in or near the optical integrating cavity 202. While the feedback sensor 334 as illustrated includes both a thermal temperature sensor 338 and the color sensor 336, the feedback sensor 334 may contain only one or the other. Although not separately shown, the system may include a separate intensity sensor, or the microcontroller may control the sensor 336 to also provide an overall indication of intensity.

If provided, the thermal temperature sensor 338 may be a simple thermo-electric transducer with an associated analog to digital converter, or a variety of other temperature detectors may be used.

The color sensor 336 detects color distribution in the integrated light within the optical integrating cavity 202. The sensor 336 may be mounted on the same board as one or more of the LEDs, or as in the example of FIG. 2, the sensor 336 may be coupled to a wall of the cavity. Some small amount of the integrated light passes through a point on a wall of the cavity 202, therefore it is sufficient to sense color at that point on the cavity wall. A variety of color sensing devices may be used to implement the sensor 336.

In the current example, the microcontroller 314 monitors color using an RGB light sensor 336 that is a digital compatible sensor which provides a single output in the form of a pulse train of a frequency that is proportional to the intensity of the input light. Additionally, the color sensor 336 may incorporate selectable color filtering. In such a case, the sensor applies one of the color filters for color of light to be sensed in response to several bits of a control signal from the microcontroller 314. The frequency of the output then is proportional to the sensed light intensity of the selected color of light (R, G or B).

For example, the microcontroller 314 may select a color and instruct the color sensor 336 to sense the intensity of that color through the appropriate filter, and as a result, the microcontroller 314 receives a pulse train of frequency proportional to the measured intensity of light of the selected color. The microcontroller 314 then selects another color and receives a pulse train of frequency proportional to the measured intensity of light of that second color. The microcontroller 314 then selects a third color and receives a pulse train of frequency proportional to the measured intensity of light of that third color. In this way, the sensor 336 can provide information to the microcontroller 314 as to the measured intensity of each primary color of light (R, G or B) within the combined light being generated by the system. The process may periodically repeats as the system takes additional measurements of the color distribution.

The control circuit 312 and specifically the microcontroller 314 is capable of setting the drive current and thus the output intensity for each color, in order to achieve a desired uniform color distribution in the combined light generated further to a calibration process described in detail below. Briefly, the microcontroller 314 translates frequency of the signals from the color sensor 336 into data that it uses as a representation of intensity for each sensed color of light. The microcontroller 314 uses the color intensity data as feedback data, to control the DACs to set the drive current value for each color, to insure that the combined light generated by the system exhibits and maintains the desired color distribution. In a system sleeper LEDs as discussed above, the microcontroller 314 also is responsive to the detected color distribution to selectively activate the inactive light emitting diodes 314 as needed, to maintain the desired color distribution in the combined light.

Figure 7:
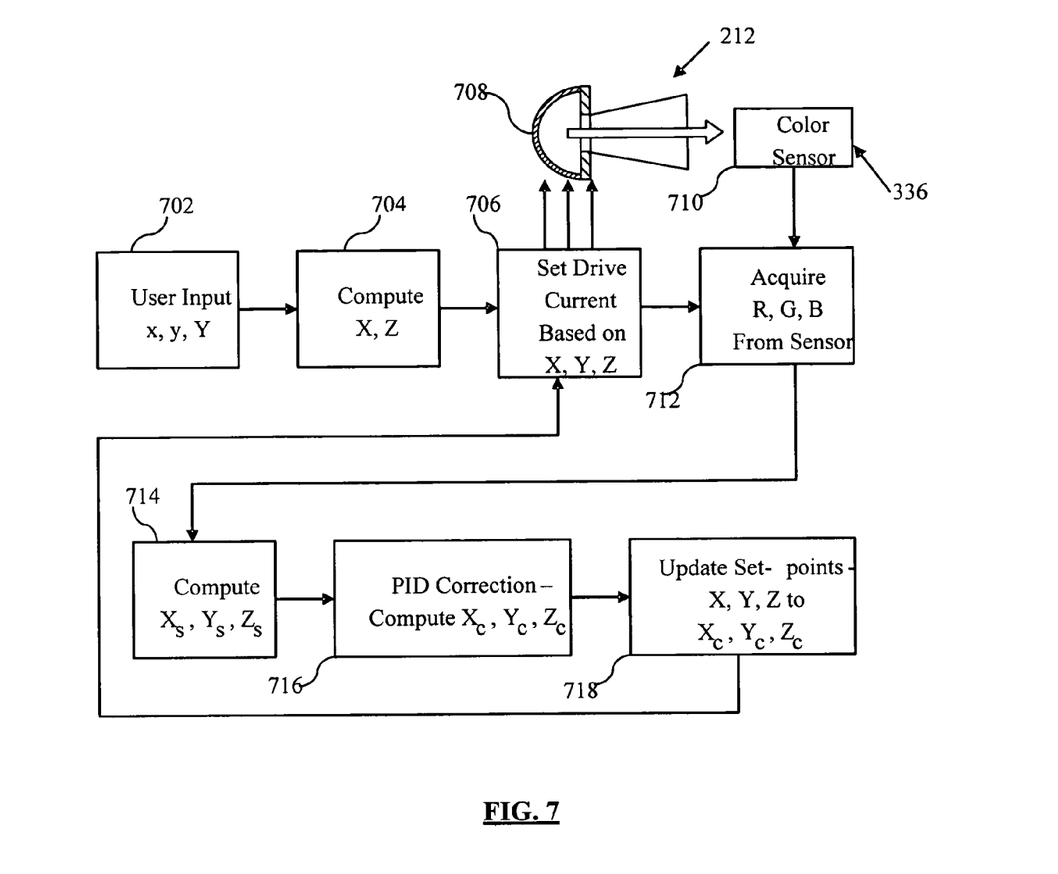
FIG. 7 illustrates the processing flow for a closed-loop control of the optical system described herein.

FIG. 7 depicts the processing flow for closed-loop control of the system described above. In Step 702, a user inputs a desired color characteristic. The input may be any convenient form of data that can specify or map to color information. The user input represents (or readily maps to) x, y chromaticity values (color coordinates) and an overall intensity value Y. The Y parameter is designed as a representation of overall brightness of light of the particular color. The chromaticity of the light is specified by two derived parameters x and y that are functions of all three tristimulus values X, Y, and Z.

Formulas are well known for conversion between the x and y chromaticity values and the X, Y and Z tristimulus values and are discussed in the Background section above. Hence, in Step 704, the microcontroller 314 processes the x, y, Y values to compute values for X, Y and Z, that is to say the red, green and blue tristimulus values.

At this point in the process, the microcontroller 314 now has all three tristimulus values X, Y, Z, and in Step 706 it sets the levels for the LED driver 324, 326, 328 signals for the red, green and blue LEDs 304, 306, 308 based on the set-point X, Y, Z values. The manner in which the microcontroller 314 converts these values will be discussed further below. As a result, in Step 708, the fixture 212 produces a combined light output with the set color of combined light output.

As described earlier, the sensor 336 senses combined light produced by the fixture 212, as in Step 710. In the next Step 712, the microcontroller 712 acquires sensed values for the intensity of red (R), green (G) and blue (B) light in the combined light generated by the system from the color sensor 336.

In Step 714, the microcontroller 314 processes the sensed amounts of R, G, B light to compute actual or sensed tristimulus values Xs, YS, ZS. For each of the color coordinates X, Y, and Z, the microcontroller 314 measures the difference (error) between the respective set-point value and the respective sensed value. Using the error value, the microcontroller 314 runs a PID (proportional, integral, derivative) computation for each of the tristimulus values in Step 716. The proportional (P) processing represents a measure of the current error; the integral (I) processing represents the accumulated error past to present; and the derivative (D) processing looks ahead in that it is an indication of the nature of the latest change in the error. The results of the P, I and D processing can be combined to predict a new value, in a manner expected to minimize the error in subsequent iterations. The PID correction processing produces corrected values, $X_c$, $Y_c$ or $Z_c$, respectively. The microcontroller 314 uses the corrected tristimulus values $X_c$, $Y_c$, $Z_c$ as new tristimulus values X, Y, Z ($X=X_c$, $Y=Y_c$, $Z=Z_c$) as shown at Step 718.

The new X, Y, Z values can then be used to set the levels of the driver signals for the red, green and blue LEDs at Step 706, so that the fixture 212 produces a combined light output with the corrected color distribution. This maintains the desired color distribution in the system output, until set to a new color distribution, e.g. in response to a new user input. The PID processing minimizes the error between the tristimulus values obtained from the actual sensed RGB values and the set point tristimulus values, that is to say for each respective color.

As discussed above in the Background section, conventional optical systems were calibrated by manual measurements of spectral outputs and adjusting drive currents to achieve desired performance at selected set-points—these values were saved as presets. In accordance with the disclosed concepts, the system can be calibrated to allow direct computation of color and intensity values. This can be accomplished by calibrating a given optical system to determine a system-specific transform function (or functions) for transforming x, y, Y inputs to RGB control signals unique to that system.

Figure 8:
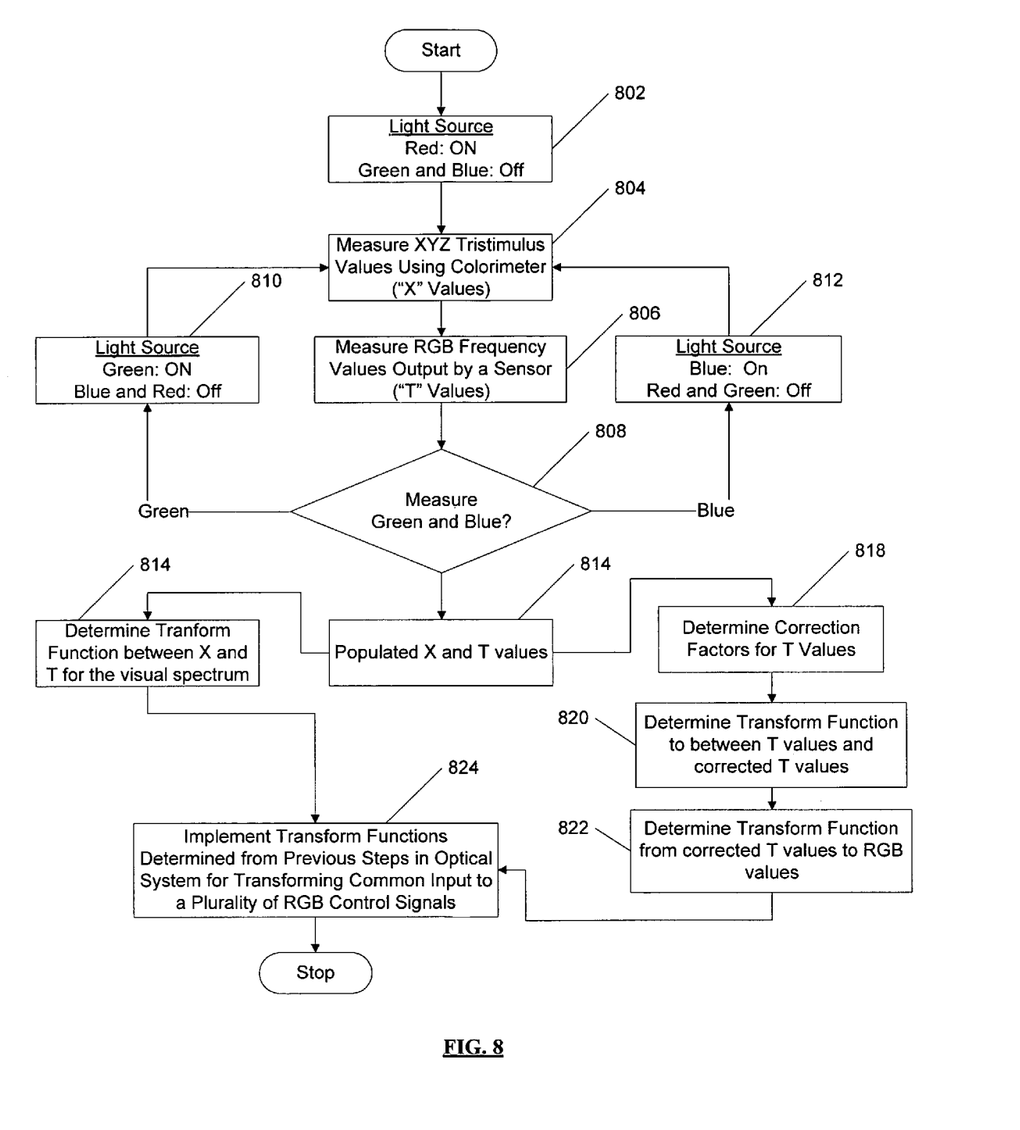
FIG. 8 illustrates an exemplary flow chart for calibrating the optical system described herein.

FIG. 8 illustrates an exemplary flow chart of a process for calibrating a solid state lighting system, such as the system discussed above relative to FIGS. 2-7. First, however, it is useful to understand a few concepts discovered by the inventors. Generally, the optical systems, such as that illustrated by FIGS. 2-6, have linear characteristics, mostly. For instance, the following equation represents the transformation of x, y, Y inputs to RGB control signals for the optical system described above:

$$\begin{bmatrix}x\\y\\Y\end{bmatrix} \to \begin{bmatrix}X\\Y\\Z\end{bmatrix} \to \begin{bmatrix}F_R\\F_G\\F_B\end{bmatrix} \to \begin{bmatrix}F_{R\_COR}\\F_{G\_COR}\\F_{B\_COR}\end{bmatrix} \to \begin{bmatrix}R_{DAC}\\G_{DAC}\\B_{DAC}\end{bmatrix} \quad \text{(Eqn. 1)}$$

In Eqn. 1, values x, y, Y corresponds to the CIE system parameters which are based on the spectral power distribution of the energy emission from a light source, and values X, Y, Z corresponds to the tristimulus values. As will be discussed below, the tristimulus values corresponds to the tristimulus measurements 112 by the calorimeter 108 as discussed above in connection with FIG. 1. $F_R$, $F_G$, $F_B$ corresponds to sensor pulse frequency values 116 output by the sensor 110, and $F_{R\_COR}$, $F_{G\_COR}$, $F_{B\_COR}$ corresponds to frequency values that have been corrected due to errors in the measurements attributed to the sensor 110. $R_{DAC}$, $G_{DAC}$, $B_{DAC}$ ("$RGB_{DAC}$") corresponds to the values 114 discussed above in connection with FIG. 1.

The inventors found that the transformation from x, y, Y inputs to corresponding frequency values F and corrected frequency values $F_{COR}$ have linear characteristics. In this manner, the transform from x, y, Y to frequency can be modeled by a series of linear transform functions. The inventors also found that transformation from corrected frequency to the RGB signals that will be used as inputs to the D/A converters 316, 318, 320, 322 can be modeled using second order equations, which will be discussed further below. Given these relationships, a system can be calibrated by determining the system-specific transform functions and storing those functions in memory associated with the microcontroller 314 for converting x, y, Y user inputs to RGB control signals during actual operation.

Transform functions offer several advantages over the conventional techniques of converting chromatic inputs to appropriate control outputs. The microcontroller 314 can compute optimal RGB control signals on the fly. This avoids the need to revert to a "look up table" or recipe table to determine appropriate output signals for a given input. In this manner, the optical system does not need to be calibrated to determine each and every value of the look up table prior to operation. This not only saves time but also lowers manufacturing costs as less man-hours are required to calibrate each optical system. Also, values in look up tables are determined based on human observation and perception. However, perception may differ from one person to another resulting in possible spectral imperfections and differences perceived from person to person and from fixture to fixture. Further, the useable range or values of output settings are not limited by the number of entries in a look-up table.

As discussed above, the transform from x, y, Y values to X, Y, Z tristimulus values is well known. In the exemplary system shown in FIGS. 2-6, the sensor provides data representing measured color intensities in the form of pulse frequencies. Hence, in an example of the calibration technique adapted to calibrate such a system, the next step is to determine the transform from the tristimulus values to frequency values, for example, according to the following equation:

$$\begin{bmatrix} X \\ Y \\ Z \end{bmatrix} \rightarrow \begin{bmatrix} F_R \\ F_G \\ F_B \end{bmatrix} \quad \text{(Eqn. 2)}$$

However, the above transform function can be represented by the following equation: x=M·t (where x corresponds to tristimulus values, t corresponds to the associated frequency components, and M is a matrix). In order to calibrate a given fixture and to solve for the matrix M that converts and correlates tristimulus values X, Y, Z to frequency values $F_R$, $F_G$, $F_B$, it would be necessary to take both tristimulus and frequency measurements of emitted light. However, no fixture or sensor is ideal. In other words, for example, no fixture or sensor is capable of outputting or detecting Red light that doesn't have some Green and Blue components present. Hence, tristimulus and frequency measurements will show other primary colors at the output of a fixture 212 when only the Red LED 304 is activated, for example. Therefore, in order to account for these conditions, measurements are taken as described below.

Tristimulus values can be determined using a calibrated colorimeter to measure the primary colors individually. This is can be accomplished by activating the Red LEDs 304 of a given fixture only and taking a measurement using a calorimeter, as in Steps 802 and 804, respectively, of FIG. 8. Frequency values can be determined using the color sensor 336, as discussed above in connection with FIG. 3. The color sensor 336 outputs a frequency measurement when the Red LED 304 is activated, as in Step 806. At this time, both $X_r$, $Y_r$, $Z_r$ and $F_{r,r}$, $F_{g,r}$, $F_{b,r}$ measurement values have been determined. ($F_{x,y}$ denotes a measurement of $F_x$ at the condition y. For instance, $F_{g,r}$ means the $F_g$ value when the Red LED is at its maximum.)

The above steps are repeated for the Green LEDs 306 and Blue LEDs 308. Specifically, following step 808, the Green LEDs 306 are activated while deactivating the Blue LEDs 308 and Red LEDs 304, and Y and $F_G$ measurements are taken (Steps 810, 804, 806). Similarly, in Steps 812, 804, 806, the Blue LEDs 308 are activated while deactivating the Green LEDs 306 and Red LEDs 304, and Z and $F_B$ measurements are taken. Accordingly the tristimulus values X, Y, Z and frequency values $F_R$, $F_G$, $F_B$ are populated to form two 3×3 matrices of measurements, as in Step 814, corresponding to a first set of data and a second set of data, respectively. In order to solve for M, as in Step 816, the "X" matrix (containing tristimulus measures) is multiplied by the inverse of the "T" matrix (containing frequency measurements) as follows:

$$M = X \cdot T^{-1} = \begin{bmatrix} X_r & X_g & X_b \\ Y_r & Y_g & Y_b \\ Z_r & Z_g & Z_b \end{bmatrix} \cdot \begin{bmatrix} F_{r,r} & F_{r,g} & F_{r,b} \\ F_{g,r} & F_{g,g} & F_{g,b} \\ F_{b,r} & F_{b,g} & F_{b,b} \end{bmatrix}^{-1} \quad \text{(Eqn. 3)}$$

Accordingly, M represents the transform function by which to change any user input to corresponding to sensor pulse frequency values for the given system. In other words, the M matrix can be used to interpolate between the max intensity values of the primary colors and off colors such that the inputted color stays within the balance of maximum red, maximum green and maximum blue that was measured. The M matrix is used to determine the expected values output buy the color sensor 336 during actual operation.

Typically, the color sensor 336 is not ideal and may incorrectly detect readings of other primary colors during the measurement (Step 806) of each of the primary colors discussed above. For example, when the Red LED 304 is ON and the Green LED 306 and Blue LED 308 are off, the color sensor 336 may nonetheless measure frequencies corresponding to the Green and Blue colors. Similar measurements may be taken when measuring Green and Blue as discussed above. This is typically referred to as "bleed over," i.e., how much intensity the color sensor 316 indicated was attributed to one color that was not in fact produced by that color of light. In order to overcome these possible errors, as in Step 818, a transform may be created to define how much bleed over exists in a given optical system as follows:

$$\begin{bmatrix} F_R \\ F_G \\ F_B \end{bmatrix} \rightarrow \begin{bmatrix} F_{RCOR} \\ F_{GCOR} \\ F_{BCOR} \end{bmatrix} \quad \text{(Eqn. 4)}$$

Error contributed by a selected primary color (in Steps 802, 810 and 812) in the other two photodiodes can be defined as follows for each Step. For Step 802, when the Red LED 304 is the only active LED in the given fixture 212, error attributed to each other LEDs in the given fixture 212 can be defined as follows:

$$\varepsilon_{R \rightarrow G} = \frac{F_G}{F_R}; \qquad \varepsilon_{R \rightarrow B} = \frac{F_B}{F_R} \quad \text{(Eqn. 5)}$$

$\epsilon_{R \rightarrow G}$ represents the error, for example, that Red produces in the Green response of the color sensor 336 as a ratio of the frequency response of the Green value divided by the frequency response of the Red value. The error that Red produces in the Blue response is similarly calculated. Also, errors for measurements of the other primary colors are similarly calculated as shown below.

For Step 810 when the Green LED 306 is the only active LED in the given fixture 212, error attributed to each of the other colors of LEDs in the given fixture 212 can be defined as follows:

$$\varepsilon_{G \rightarrow R} = \frac{F_R}{F_G}; \qquad \varepsilon_{G \rightarrow B} = \frac{F_B}{F_G} \quad \text{(Eqn. 6)}$$

For Step 812 when the Blue LED 308 is the only active LED in the given fixture 212, error attributed to each other LEDs in the given fixture 212 can be defined as follows:

$$\varepsilon_{B \rightarrow R} = \frac{F_R}{F_B}; \qquad \varepsilon_{B \rightarrow G} = \frac{F_G}{F_B} \quad \text{(Eqn. 7)}$$

In condensed form, the following error correction matrix $\Gamma$ can be formed:

$$\Gamma = \begin{bmatrix} 1 & \varepsilon_{G \to R} & \varepsilon_{B \to R} \\ \varepsilon_{R \to G} & 1 & \varepsilon_{B \to G} \\ \varepsilon_{R \to B} & \varepsilon_{G \to B} & 1 \end{bmatrix} \quad \text{(Eqn. 8)}$$

Similar to the transform functions described above, in Step 820, the transform from frequency to a corrected frequency can be defined as follows:

$$\begin{bmatrix} F_R \\ F_G \\ F_B \end{bmatrix} = \Gamma \cdot \begin{bmatrix} F_{R\_COR} \\ F_{G\_COR} \\ F_{B\_COR} \end{bmatrix} \quad \text{(Eqn. 9)}$$

Because the frequency values $F_R$, $F_G$, $F_B$ were measured in Step 806 for each respective primary color (Steps 802, 810, 812), $\Gamma$ is a known value. Therefore, corrected frequency values can be determined readily for any input according to the following equation:

$$\begin{bmatrix} F_{R\_COR} \\ F_{G\_COR} \\ F_{B\_COR} \end{bmatrix} = \Gamma^{-1} \cdot \begin{bmatrix} F_R \\ F_G \\ F_B \end{bmatrix} \quad \text{(Eqn. 10)}$$

$$= \begin{bmatrix} 1 & \varepsilon_{G \to R} & \varepsilon_{B \to R} \\ \varepsilon_{R \to G} & 1 & \varepsilon_{B \to G} \\ \varepsilon_{R \to B} & \varepsilon_{G \to B} & 1 \end{bmatrix}^{-1} \cdot \begin{bmatrix} F_R \\ F_G \\ F_B \end{bmatrix}$$

(Eqn. 10)

In other words, multiplying the $\Gamma^{-1}$ matrix by the results from the frequency results $(F_R, F_G, F_B)$ calculated from the previous transform appropriately scales the frequency results $(F_R, F_G, F_B)$ to account for the error in the readings from the color sensor 336.

Step 822 involves determining the transform to the signals $(R_{DAC}, G_{DAC}, B_{DAC})$ sent to the D/A converters 216, 218, 220, 222 to control the LEDs according to the following equation:

$$\begin{bmatrix} F_{R\_COR} \\ F_{G\_COR} \\ F_{B\_COR} \end{bmatrix} \to \begin{bmatrix} R_{DAC} \\ G_{DAC} \\ B_{DAC} \end{bmatrix} \quad \text{(Eqn. 11)}$$

It is noted that the $RGB_{DAC}$ signals may be generated based on the frequency results $(F_R, F_G, F_B)$ as opposed to the corrected frequency results $(F_{R\_COR}, F_{G\_COR}, F_{B\_COR})$. Nonetheless, the following describes calculations based on the corrected frequency results $(F_{R\_COR}, F_{G\_COR}, F_{B\_COR})$.

While the correlations functions previously discussed have been linear functions, it has been found that the transform from frequency (either frequency or corrected frequency) is non-linear. This is due to the non-linear characteristics of the D/A converters 316, 318, 320, 322. Specifically, the D/A converters 316, 318, 320, 322 may be set between 0 and 1023 (1024 different settings). However, it has been empirically determined that the above system transform function corresponds to second order functions as follows:

$$R_{DAC} = C_{R2} \cdot F_{R\_COR}^2 + C_{R1} \cdot F_{R\_COR} + C_{R0}$$

$$G_{DAC} = C_{G2} \cdot F_{G\_COR}^2 + C_{G1} \cdot F_{G\_COR} + C_{G0}$$

$$B_{DAC} = C_{B2} \cdot F_{B\_COR}^2 + C_{B1} \cdot F_{B\_COR} + C_{B0} \quad \text{(Eqn. 12)}$$

Using MATLAB's "polyfit function" for a second order equation, the coefficients $C_{xi}$ (where x represents the RGB component and i represents the order of the coefficient) can be determined. Other mathematical programs likewise could be used to solve the series of equations above.

In summary, the following conversions having known values can be determined based on the tristimulus measurements and frequency measurements as described above: (1) matrix M to transform tristimulus values (X,Y,Z) to frequency values $(F_R, F_G, F_B)$ (see Eqns. 1-3); (2) matrix $\Gamma$ to transform frequency values $(F_R, F_G, F_B)$ to corrected frequency values $(F_{R\_COR}, F_{G\_COR}, F_{B\_COR})$ (see Eqns. 4-10); and (3) coefficients $C_{xi}$ to transform corrected frequency values $(F_{R\_COR}, F_{G\_COR}, F_{B\_COR})$ to the signals $(R_{DAC}, G_{DAC}, B_{DAC})$ sent to the D/A converters 316, 318, 320, 322 (see Eqns. 11-12). These known values can be stored in memory associated with the microcontroller 314, as described above. As a result, any user input (x,y,Y or X,Y,Z) can be immediately converted into the $(R_{DAC}, G_{DAC}, B_{DAC})$ signals that have been calibrated for the given optical system. The following provides a description of just how the implementation will operate, in a system, after calibration.

Figure 9:
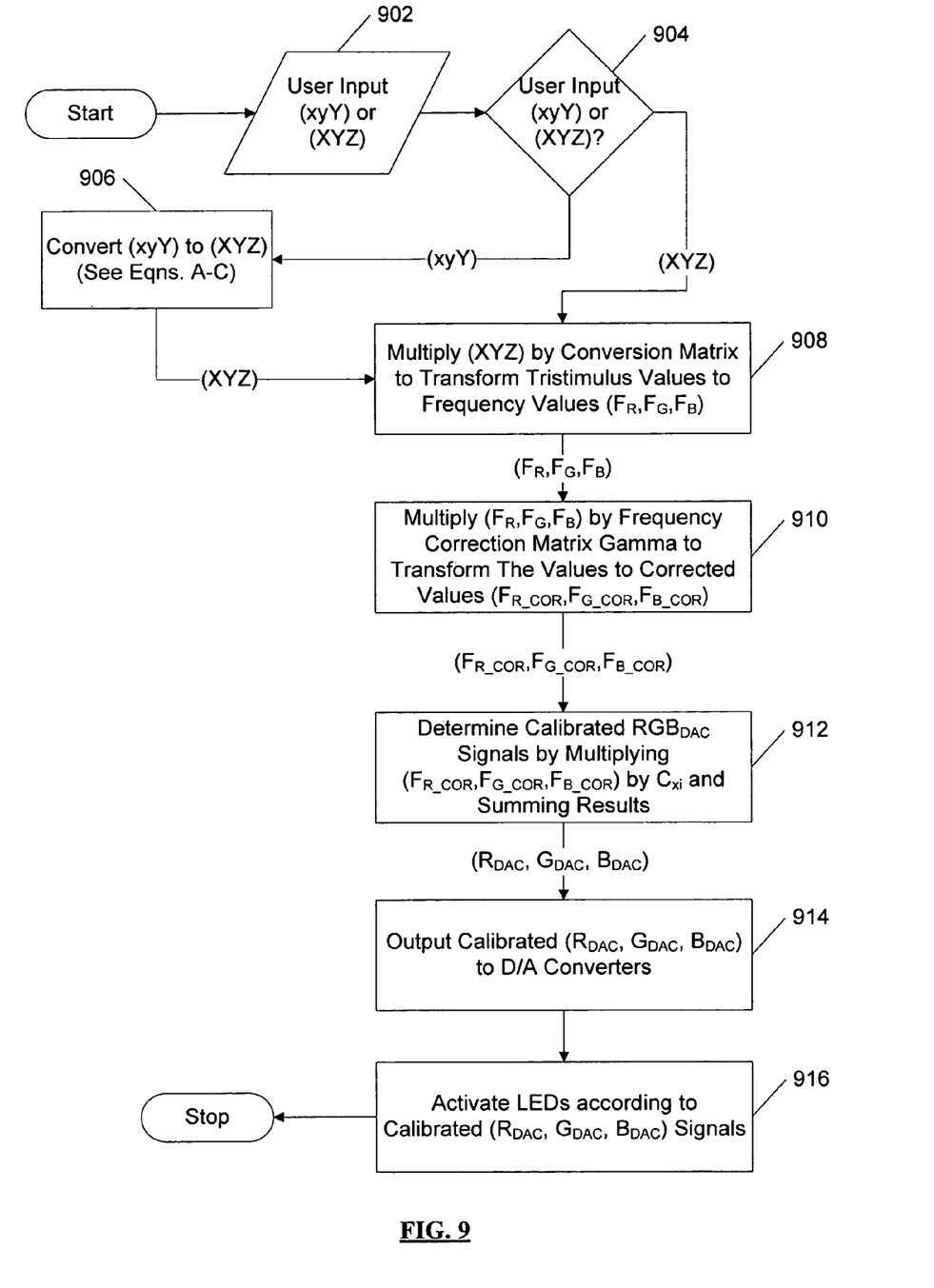
FIG. 9 illustrates a flowchart of the steps by which the optical system described herein initially operates following user inputted color parameters.

FIG. 9 illustrates a flowchart showing the steps by which the optical system described above initially operates following user inputted color parameters. FIG. 9 expands on the Steps 702-706 described above in connection with FIG. 7. Specifically, FIG. 9 illustrates the process steps immediately following a user input of color parameters before feedback characteristics have been established, as described above in connection with FIG. 7. However, in this initial period, the optical system immediately outputs light true to the user inputs due to the calibration described above. Once the system attains a steady state, the optical system continues to operate as described above in connection with FIG. 7 until the user inputs new color values. At this time, the steps shown in FIG. 9 repeat for the new input.

In Step 902, a user inputs selected color values. A user may input color as xyY values or XYZ values since the microcontroller 314 can be programmed to distinguish between the two standards. Moreover, it is well within the level of one of ordinary skill in the art to program the microcontroller 314 to distinguish between other color parameters inputted by a user. The disclosed concepts are not necessarily limited to user inputs in either xyY or XYZ.

Following Step 902, the microcontroller 314 determines whether the user input color components as xyY or XYZ values (Step 904). If the user input xyY values, the microcontroller converts xyY values to tristimulus XYZ values using equations A-C described above. Next, in Step 908, the tristimulus values XYZ, either calculated in Step 906 or input by the user in Step 902, are multiplied by the conversation matrix M previously determined and stored in the system according to the following equation: $t = M^{-1} \cdot x$, where x is a vector of the tristimulus values (3×1 matrix) and M is a 3×3 matrix calculated above in Eqn. 3. The output is a set of frequency values $(F_R, F_G, F_B)$ (3×1 matrix) that emulate the feedback characteristics and readings of the color sensor 336 specific for the given optical system.

In Step 910, the outputted frequency values ($F_R, F_G, F_B$) are corrected for inaccurate readings of the color sensor 336 during the calibration steps described above. Specifically, corrected frequency values ($F_{R\_COR}, F_{G\_COR}, F_{B\_COR}$) can be calculated according to Eqn. 10 described above, where $\Gamma$ is a known 3×3 matrix that was calculated during calibration steps described above.

In Step 912, the outputted corrected frequency values ($F_{R\_COR}, F_{G\_COR}, F_{B\_COR}$) are transformed into ($R_{DAC}, G_{DAC}, B_{DAC}$) signals that have been calibrated for the given optical system. Specifically, these signal values are calculated according to Eqn. 12 where the corrected frequency values $F_{R\_COR}, F_{G\_COR}, F_{B\_COR}$ and coefficients $C_{xi}$ have been determined previously.

In Steps 914 and 916, signals ($R_{DAC}, G_{DAC}, B_{DAC}$) are output to respective D/A converters 316, 318, 320 for activating the LED drivers 324, 326, 328 and associated LEDs 304, 306, 308. From this point on, the system continues to operate as described above in connection with FIG. 7, and specifically Steps 708-718, until a new color is selected by user inputted values.

The above-described calibration techniques, flow diagrams, mathematical techniques, optical systems, etc. have been described in accordance with XYZ or xyY inputs. However, it should be appreciated that other inputs on the system may be used, such as RGB. It the case of RGB values, well known transforms may be used to transform RGB values to xyY or XYZ values, which would then be used as described hereinabove.

Also, The above-described calibration techniques, flow diagrams, mathematical techniques, optical systems, etc. have been described in accordance with using a sensor that outputs a pulse frequency that is proportional to the measured intensity of light. However, it should also be appreciated that a temperature sensor 338, such as that illustrated by FIG. 3, may be used to model any second order effects of temperature on the optical system. As a result, the calibrated values determined using the pulse frequency sensor may be adjusted by factoring in readings from the temperature sensor to account for variations in the LEDs and linearity of the frequency pulse sensor and/or calibrated meter due to temperature.

The above-described calibration techniques and operation are not limited to only Red, Green and Blue LEDs. It is again noted that the optical system may include other LEDs 310 and associated D/A converter 322 and LED driver 330. In such a case, additional components of the optical system would need to be calibrated possibly resulting in larger M×N matrices. In any event, additional calculations required should be well within the level of ordinary skill given this disclosure and concepts presented herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for calibrating a lighting fixture comprising:
a plurality of light sources and outputting combined light from the sources wherein the plurality of light sources have different spectral outputs relative to an input setting which represents a desired characteristic of the combined light, each source comprising one or more light emitting diodes (LEDS), wherein the lighting fixture is configured such that the combined LED light output by the lighting fixture into an area or region is sufficient for a humanly perceptible illumination lighting application in the area or region,
the method comprising steps of:
   (a) generating a first set of data corresponding to measurements of a spectral characteristic of the combined LED light output using a calibrated meter;
   (b) generating a second set of data corresponding to characteristics of the combined LED light output determined using a sensor different from the calibrated meter;
   (c) determining a transform function in response to the first set of data and the second set of data that models a feedback response of the lighting fixture for each of a plurality of different input settings that would cause the lighting fixture to generate radiant energy within a predetermined range of a spectrum; and
   (d) programming the transform function in the lighting fixture to enable the lighting fixture to transform an input to the lighting fixture to a plurality of unique control signals each for controlling a respective light source of the plurality of LED light sources.

2. The method according to claim 1, wherein the plurality of LED light sources are configured to generate a plurality of color components so as to output the combined LED light, further comprising repeating steps (a) and (b) for each of the plurality of different input settings which correspond to the plurality of color components.

3. The method according to claim 2, wherein step (c) further comprises the steps of:
   (i) populating the first set of data and the second set of data into matrices; and
   (ii) determining the transform function to transform the input to a unique control signal for each of the plurality of LED light sources based on the populated results.

4. The method according to claim 3, wherein the transform function comprises a plurality of transform functions.

5. The method according to claim 4, wherein at least one of the plurality of transform functions has linear characteristics.

6. The method according to claim 4, wherein at least one of the plurality of transform functions is represented by an M×N matrix.

7. The method according to claim 2, wherein each of the plurality of color components corresponds to a primary color.

8. The method according to claim 1, wherein the second set of data corresponds to a measurement of frequency of the spectral output, further comprising the steps of:
   (i) determining an amount of error attributed to the sensor used to determine the characteristics of the output of the plurality of LED light sources; and
   (ii) adjusting the transform function for the amount of error determined in step (i).

9. The method according to claim 1, wherein the transform function determined in step (c) corresponds to a plurality of transform functions to transform the input to the plurality of unique control signals.

10. The method according to claim 9, wherein at least one of the plurality of transform functions has linear characteristics.

11. The method according to claim 9, wherein at least one of the plurality of transform functions is represented by an M×N matrix.

12. The method according to claim 10, wherein at least one of the plurality of correlation functions has non-linear characteristics.

13. The method according to claim 11, wherein at least one of the plurality of transform functions has non-linear characteristics.

14. The method according to claim 1, wherein:

a characteristic of combined LED light output by the plurality of LED light sources based on the plurality of unique control signals is substantially the same as a desired characteristic of light represented by an input to the lighting fixture, and the input causes the lighting fixture to generate radiant energy within the predetermined range of the spectrum.

15. The method according to claim 1, wherein the predetermined range of the spectrum corresponds to a visual spectrum.

16. The method according to claim 1, wherein the transform function determined in step (c) is applicable to substantially all inputs to the lighting fixture that would cause the lighting fixture to generate light within the predetermined range of the spectrum.

17. The method according to claim 1, wherein the first set of data corresponds to a measure of tristimulus values.

18. The method according to claim 1, wherein the second set of data corresponds to a measure of frequency values that represent spectral characteristics of light emitted from the plurality of LED light sources.

19. The method according to claim 1, wherein the lighting fixture further comprises:

an optical integrating cavity coupled to receive electromagnetic energy of the LEDS, for mixing the received energy to form the combined LED light output into the area or region to facilitate the humanly perceptible lighting application.

* * * * *